United States Patent [19]

Gram

[11] 4,410,080

[45] Oct. 18, 1983

[54] DELIVERY DEVICE FOR A FREEZING PLANT

[75] Inventor: Hans Gram, Vojens, Denmark

[73] Assignee: Brødrene Gram A/S, Vojens, Denmark

[21] Appl. No.: 260,991

[22] Filed: May 6, 1981

[30] Foreign Application Priority Data

May 19, 1980 [DK] Denmark .............................. 2176/80

[51] Int. Cl.³ .............................................. B65G 17/04
[52] U.S. Cl. .................................... 198/715; 198/842
[58] Field of Search ............... 198/842, 843, 848, 849, 198/715, 834, 835

[56] References Cited

U.S. PATENT DOCUMENTS

| 2,628,706 | 2/1953 | Guba | 198/848 |
| 2,787,913 | 4/1957 | Hageline | 198/834 |
| 2,940,586 | 6/1960 | Vamvakas | 198/835 |

FOREIGN PATENT DOCUMENTS 716387  1/1942  Fed. Rep. of Germany ...... 198/715
701878  12/1979  U.S.S.R. .............................. 198/715

*Primary Examiner*—Joseph E. Valenza
*Assistant Examiner*—Jonathan D. Holmes
*Attorney, Agent, or Firm*—Watson, Cole, Grindle & Watson

[57] ABSTRACT

An end reversing roller for a conveyor band of wire mesh is arranged at the delivery end of a freezing canal. The end reversing roller is provided with axially extending slats. The outer surfaces of the slats are spaced from the shaft of the reversing roller, a distance which is greater than the radius of the cylindrical surface which the wire mesh would otherwise follow. The outer surfaces of the slats will therefore engage the inner surface of the wire mesh whereby the wire mesh is caused to expand. Accordingly, relative movement occurs between the wire mesh and the material or the product which have been frozen in the freezing apparatus, and an effective breaking-off of the frozen material or the frozen product with respect to the wire mesh is effected.

1 Claim, 6 Drawing Figures

DELIVERY DEVICE FOR A FREEZING PLANT

BACKGROUND OF THE INVENTION

The present invention relates to a delivery device for a freezing plant of the type in which the material or the products to be frozen are moved through the freezing plant supported by a continuous web of wire mesh or by wire mesh mats, and where the web or the mats are moved about a part of the circumference of a roller for delivery of the frozen material.

Such delivery devices are known, for example, in connection with simple freezing tunnels in which an endless wire mesh belt is moved about two end reversing rollers. At the end reversing roller arranged at the exit of the freezing tunnel there is usually provided a scraper for removing the frozen material or the frozen products, as the belt is moving about such reversing roller. Delivery devices of the aforesaid type are also known in connection with freezing plants where the goods to be frozen are supported by wire mesh mats which with the aid of elevator means are moved vertically inside the freezing plant, and which upon leaving the elevator means are caused to form a substantially continuous belt which is likewise moved about a roller at which a scraper is also provided. This movement performed by the wire mesh web or the wire mesh mats as they move about a part of the roller, i.e. the delivery roller, causes some of the material or some of the products to loosen from the wire mesh. This is due to the fact that the material or the products, naturally, are hard as a result of their frozen state, whereas the wire mesh passes from a flat to a general cylindrical form. The material or the products not broken off in this manner must be removed by means of the scraper.

The breaking-off explained above is highly imperfect when a wire mesh web or wire mesh mats are used, so that the material or the products may be torn when passing the scraper. It is also known to use a web or mats comprising mutually hinged slats. The slats are oriented with their longitudinal axes transversely of the travelling direction of the web or the mats. When passing the breaking-off roller the slats will be subject to an angular motion in relation to each other. This produces a well-defined mutual movement of the individual slats and accordingly, an efficient breaking-off. Accordingly, the difference between the slat constructions and the wire mesh constructions is in that in the former case a well-defined angular motion of the slats in relation to each other is produced as they pass the breaking-off roller, whereas this does not apply in the latter case. It should also be mentioned that the end reversing roller or the breaking-off roller usually merely includes a shaft with sprockets mounted at the ends thereof to engage respective chains arranged along the lateral edges of the continuous web, or when mats are used, then along the lateral edges thereof. It will be understood that in the latter case the subject chains may be chain sections, i.e. sections with lengths corresponding to the length of the mats.

SUMMARY OF THE INVENTION

The delivery device according to the present invention is characterized in that the roller has axially extending supporting slats whose outer surfaces are spaced from the axis of the roller such that the outer surfaces of the supporting slats are urged against the inner surface of the wire mesh as this passes round the roller. This has the advantage that the wire mesh when passing the roller will not change from a generally flat to a generally circular, cylindrical form, but will instead form relatively flat areas, i.e. between the areas where the slats exert a pressure on the inner surface of the wire mesh, and at the same time, at the areas where the slats exert a pressure on the inner surface of the wire mesh, this will assume a more accurate curvature than would otherwise be the case. Since the slatted webs or mats have a better breaking-off effect than that obtained with the wire mesh, the delivery device of the present invention provides a breaking-off effect of wire mesh webs or mats which is far superior to that achieved by the heretobefore known delivery devices of the aforesaid type. In order to impart to the supporting slats satisfactory rigidity, these may according to an embodiment of the invention be backed up by supporting discs between their ends. According to another embodiment of the invention, the supporting slats may comprise hard rubber or sheet metal with a hard rubber coating. This provides good engagement with the inner surface of the wire mesh and also a certain degree of flexibility as regards the engagement between the supporting slats and the wire mesh, and this further enhances the somewhat irregular change of form explained above to which the wire mesh is subjected during its passage of the roller, whereby the breaking-off effect is further supported.

If the web or mats are provided along their lateral edges with chains, and the ends of the roller are provided with matching sprockets, the wire mesh as it engages the sprockets will change from a flat to a circular, cylindrical form, as mentioned above, and the wire mesh will assume a curvature having a radius of curvature corresponding to the pitch circle of the sprockets, provided, however, that the wire mesh is arranged opposite the pitch lines of the lateral chains, i.e. the lines which during the passage of the laterial chains around the sprockets coincide with the pitch circles of the sprockets. Naturally, this need not be the case as the wire mesh might very well be arranged in offset relationship to the pitch lines of the corresponding lateral chains. Accordingly, the wire mesh in the known delivery devices would obtain a radius of curvature during passage of the sprockets which is correspondingly greater or smaller than the pitch circles thereof, but due to the fact that the lateral chains are of limited thickness only, it is merely a matter of minor variations. The crucial point, however, is that without the presence of this invention the engagement between the sprockets and the lateral chains would result in a well-defined radius of curvature of the wire mesh during its passage.

By experiments underlying the present invention it has been found that an excellent result is obtained with respect to this improved breaking-off effect if the spacing between the outer surface of the supporting slats and the drum axis is about five percent greater than the spacing between the wire mesh and the drum axis as explained above and determined by the engagement of the sprockets with the lateral chains.

DESCRIPTION OF THE PREFERRED EMBODIMENTS

Figure 2:
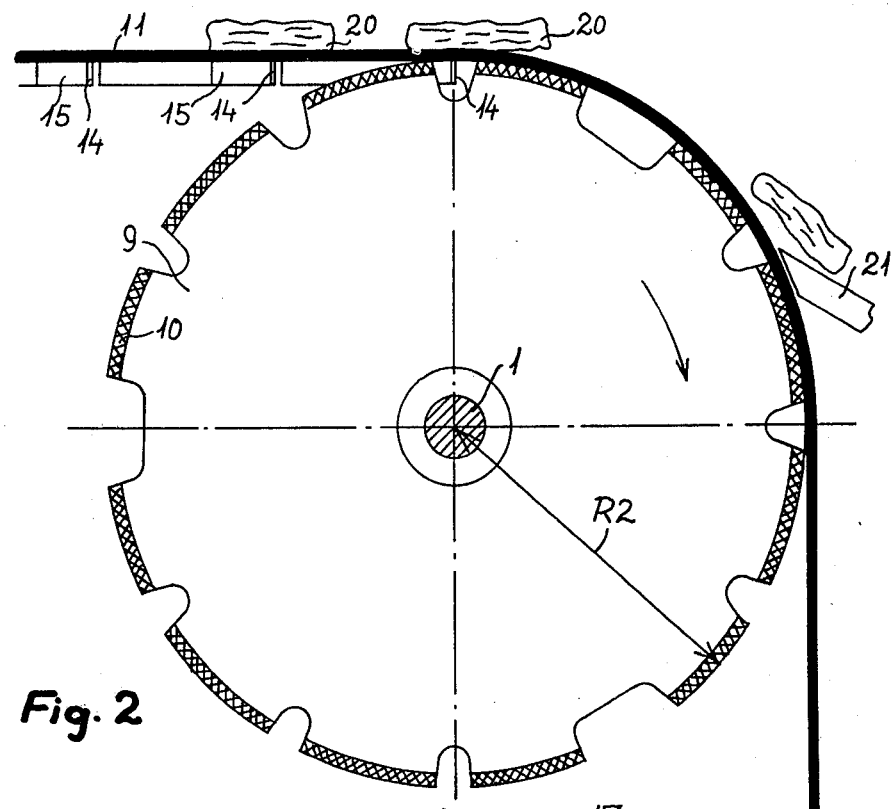
FIGS. 2 and 3 represent sectional views taken along the lines II—II and III—III respectively of FIG. 1A, and FIGS. 4 and 5 show wire mesh sections.

In the drawings the delivery drum includes a shaft 1 having its ends journalled in respective bearing boxes 2. These boxes are secured to stationary parts of a freezing plant, which parts are schematically shown in the drawings and are designated 3 and 4. At each end the shaft 1 supports a sprocket 5 and 6 respectively, and inside each of these the shaft 1 supports an additional sprocket, 7 and 8 respectively. Four supporting discs 9, shown in plan view in FIG. 2, are secured to the shaft 1 with mutual spacing and generally uniform distribution between the sprockets 7 and 8. The supporting discs 9 carry along their circumference a plurality of supporting slats 10, of which there are 12 in the embodiment illustrated in the drawings.

Figure 1A:
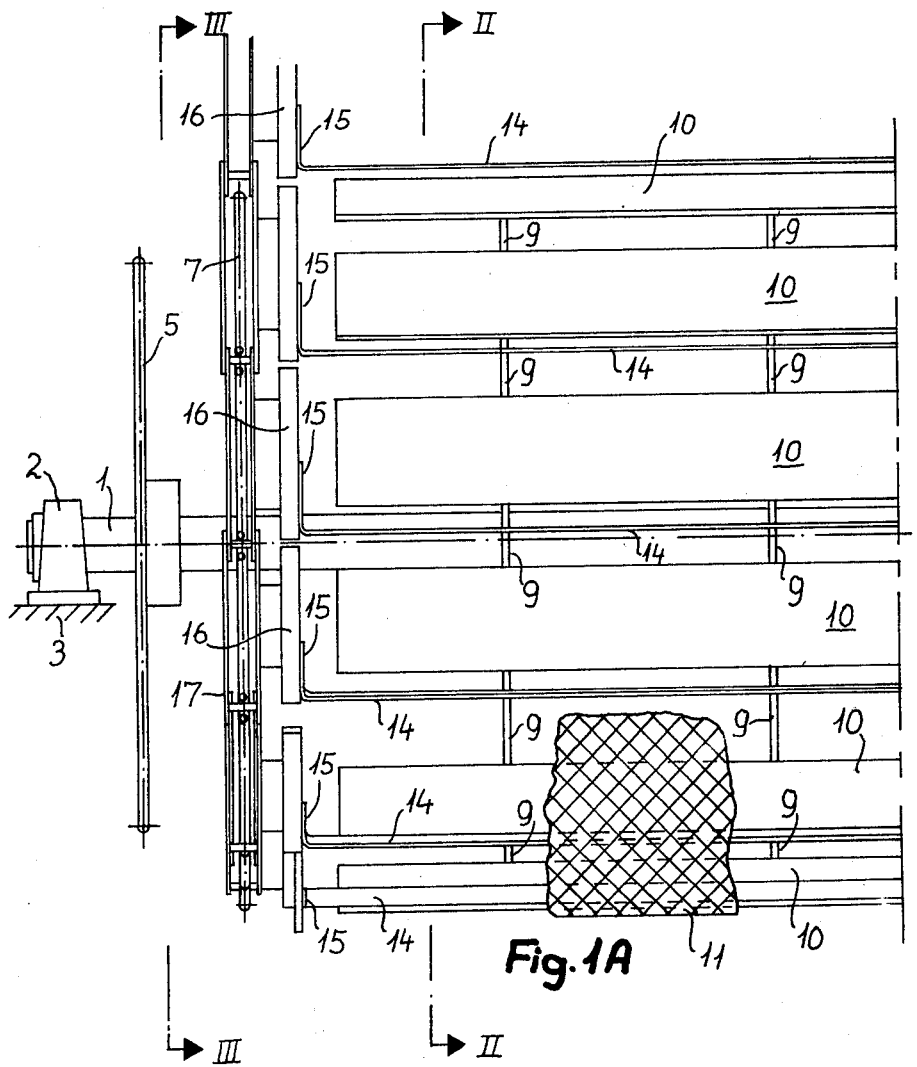
FIGS. 1A and 1B when placed in side by side relationship show an embodiment of the delivery device according to the invention, viewed from above.

The drum described above is designed to serve as a breaking-off roller for material or products conveyed through the freezing plant and supported by wire mesh 11. FIG. 1A shows a section of this wire mesh 11. If the freezing plant, for example, comprises a simple freezing tunnel, the wire mesh 11 will form a continuous endless web and the wire mesh will be passed around the breaking-off roller at the discharge end of the freezing tunnel, and at the entrance to the freezing tunnel it will be passed around a reversing cylinder or roller arranged at the entrance. The delivery device according to the present invention, however, may also be used when the material is moved through the freezing plant on so-called mats. In such case the freezing plant incorporates one or more elevators, and these serve to move the mats inside the freezing plant in disconnected relationship and one above the other. And, these mats are removed from the elevator or the last one thereof, if more elevators are provided, and during this removal the rear end of a just removed mat is placed directly in front of the leading end of the next removed mat, which means that the mats will form a substantially continuous belt. This is passed around the breaking-off roller for removal of the frozen products or material carried by the mats. After passing the breaking-off roller, the belt formed by the mats is passed to the first elevator in the freezing plant, and after providing the mats with fresh material or products to be frozen, they are introduced to this elevator, being disconnected from each other.

The embodiment illustrated in the drawings is a freezing plant of the latter type, for which reason the term "mat" will be used below for the sake of clarity.

Figure 4:
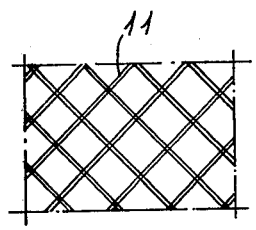
Figure 5:
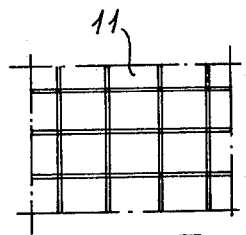
Figure 1B:
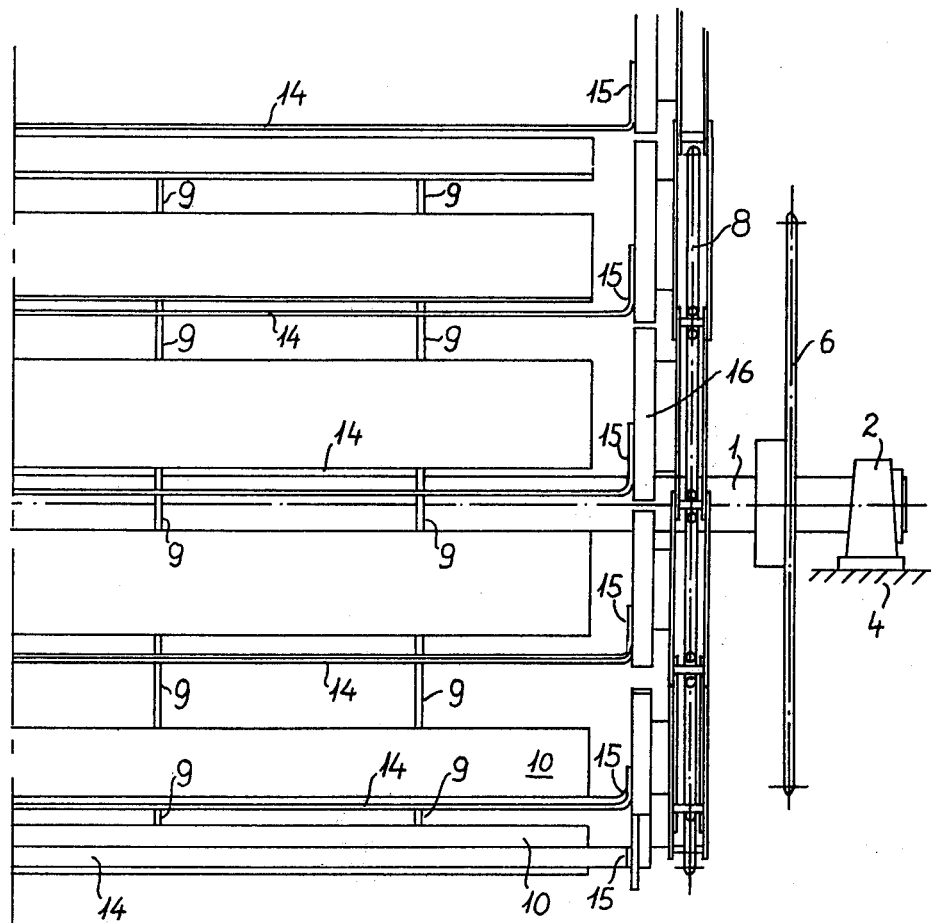
Figure 3:
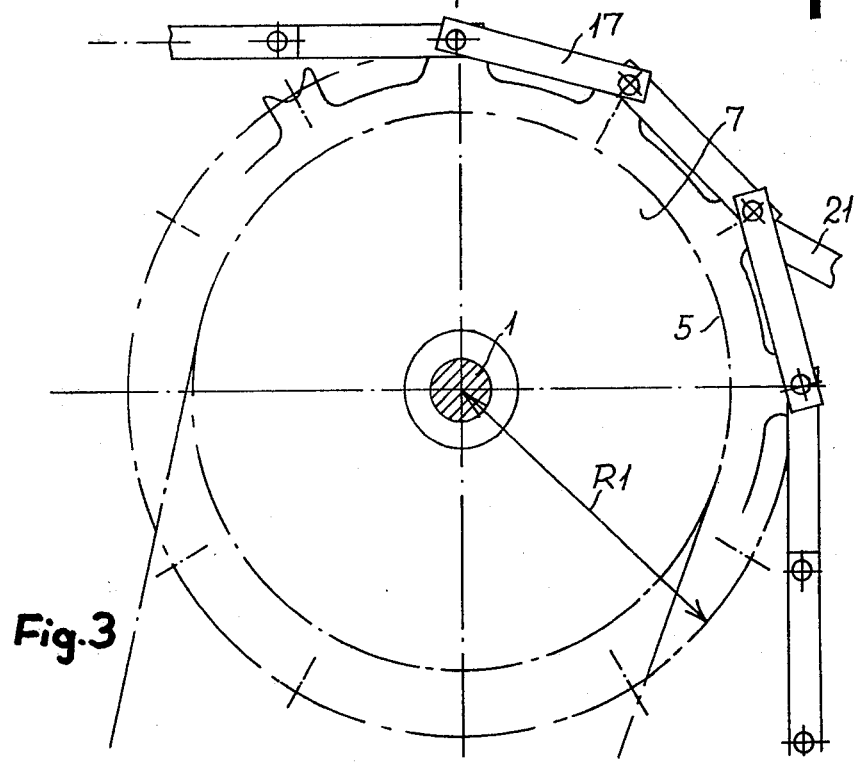

Each mat comprises a section of wire mesh 11 shown in FIG. 1A, FIGS. 4 and 5 illustrating other embodiments of such a wire mesh. The wire mesh of each mat is supported by a plurality of braces 14 extending transversely of the mat and having bent ends as indicated at 15. End pieces 16 are secured to the bent ends of the braces, and each of the end pieces is connected to a chain link 17 of a lateral chain for the wire mesh piece 11 of the mat. As shown in FIGS. 1A and 1B, such a chain 17 is provided at each side of the mat, and these chains engage with the sprockets, 7 and 8 respectively, in the manner shown in FIG. 3. The wire mesh 11 is connected with the braces 14 by means of wire strands, not shown, which before being bent are U-shaped. Each of these U-shaped wire pieces is moved inwardly with the legs of the U gripping around a wire mesh wire and a brace 14. The inserted ends are then twisted or welded together. Accordingly, the wire mesh will be able to move slightly with respect to the braces 14.

It will be understood from the aforedescribed that when the delivery device illustrated in the drawings is operative, the shaft 1 is driven by chains, not shown, which engage the sprockets 5 and 6. This causes the shaft 1 and the two other sprockets 7 and 8 to rotate with the effect that the lateral chains 17, 17 of the mat are driven in the direction indicated by the arrow in FIG. 2. The slats 10 will now engage the inner surface of the wire mesh 11 (i.e. the side facing inwardly toward the shaft 1 as the wire mesh passes the drum), and this engagement takes place between the braces 14. In the embodiment illustrated in the drawings the wire mesh 11 is arranged between the lateral chains 17, 17 opposite their pitch lines, i.e. the lines which, when the mat moves about the drum, coincide with the pitch lines of the sprockets 7 and 8. The engagement between the outer surface of the slats 10 and the inner surface of the wire mesh takes place by virtue of the fact that the outer surfaces of the slats 10 have greater spacing from the axis of the shaft 1 than the radius of the pitch circles of the sprockets 7 and 8, i.e. greater than the radius of the generally cylindrical path which the wire mesh would follow if it, during its passage of the drum, did not engage with the outer surfaces of the slats 10. In the embodiment illustrated in the drawings the outer surfaces of the slats 10 have a spacing from the axis of the shaft 1 which is about 5 percent greater than the pitch circles of the sprockets 7 and 8. It will be appreciated, however, that it is not a prerequisite that the wire mesh 11 extend in the exact plane which, when the wire mesh 11 is out of engagement with the slats 10, is defined by the pitch lines of the lateral chains 17, 17. The wire mesh 11 may very well be laterally offset in relation to these pitch lines, and in that case it is merely required to adjust the spacing between the outer surfaces of the slats 10 and the axis of the shaft 1 in relation thereto.

As shown in FIGS. 1A and 1B, the slats 10 have a length slightly less than the spacing between the lateral chains 17, 17, which has the effect that the engagement between the outer surfaces of the slats 10 and the inner surface of the wire mesh described above will not interfere with the engagement between the lateral chains 17 and the sprockets 7, 8. On the contrary, the fact is that the slats 10, besides urging the engaging parts of the wire mesh 11 outwardly, will at the same time cause a slight transverse stretching of the wire mesh 11 since the edges thereof will be caused to follow the pitch lines of the lateral chains 17. The wire mesh 11 is thus "tightened up" as it passes the roller by virtue of the engagement with the slats 10 with the effect that the wire mesh is subject to a change of form. First of all, it will be stretched radially outwardly along transverse zones substantially corresponding to the width of the slats 10, and at the same time, as explained above, the wire mesh will likewise be stretched slightly in the transverse direction. Secondly, between the slats 10 the wire mesh will have a tendency to form a flat transverse area. This produces an irregular form of the wire mesh due to the engagement with the slats 10, and this imparts to the wire mesh a relative movement in relation to the material or the products which have been frozen inside the freezing plant and are supported by the subject wire mesh. Such products 20 are shown schematically in FIG. 2. And, in FIG. 2 the wire mesh is indicated by a heavy black line 11, and this Figure also shows the braces 14 with their bent ends 15.

FIG. 2 furthermore shows the radial spacing R2 from the axis of the shaft 1 to the outer surfaces of the slats 10, and it will be seen that this spacing is about 3 percent greater than the pitch circle radius R1 of the sprocket 7. As described above, this applies on the assumption that the wire mesh, in the absence of the slats 10, would follow the cylindrical surface defined by the pitch circles of the sprockets 7, 8 which in turn is subject to the condition that the wire mesh is supported co-planar with the pitch lines of the claims 17, 17 along the straight runs of these lateral chains. The spacing R2 and the radius R1 may thus be identical, but if so the wire mesh must be supported in relation to the lateral chains 17, 17 within their pitch lines.

In the embodiment shown in the drawings the slats 10 comprise hard rubber, which has proved to be a suitable material. The slats, however, may also comprise another material such as a metal sheeting having an outer rubber coating.

As shown in FIG. 2, there is arranged a shute 21 which serves to guide the frozen products 20 away from the wire mesh 11. The shute is wedge-shaped at its upper edge so as to have minimum spacing from the outer surface of the wire mesh 11, which means that the shute 21 will at the same time serve as a scraper for removal of any remaining material that might still adhere to the wire mesh 11.

I claim:

1. A delivery device for a freezing plant of the type in which the material or the products to be frozen are moved through the freezing plant supported by a conveyor belt comprising a continuous web of open wire mesh or mutually connected open wire mesh mats, said conveyor belt being capable of stretching in longitudinal and transverse directions, spaced transverse braces supporting said wire mesh web or said wire mesh mats so as to form a generally planar supporting surface for said material or products while being conveyed through said freezing plant, conveyor chains connected to opposed ends of said braces, said delivery device comprising a roller about a part of which said conveyor belt is movable for delivery of the frozen material or products, said roller having axially extending supporting slats the opposing ends of which are spaced inwardly of opposed lateral edges of said wire mesh web or wire mesh mats, and said roller having a sprocket at each end for engaging said chains, the spacing between the outer surfaces of said slats and the axis of said roller being greater than the spacing between said wire mesh web or said wire mesh mats and the axis of said roller as determined by engagement of said sprockets and said chains so as to deform said wire mesh web or said wire mesh mats outwardly with respect to the lateral edges of said wire mesh web or said wire mesh mats during the passage of said wire mesh web or said wire mesh mats about said part of said roller for causing mutual movements of the wires of said mesh in said longitudinal and transverse directions for importing to said conveyor a relative movement to the material or the products supported thereon, thereby resulting in a clean removal of the material or products from said conveyor.

* * * * *